(12) United States Patent
Clevorn et al.

(10) Patent No.: US 11,005,544 B2
(45) Date of Patent: May 11, 2021

(54) COMMUNICATION DEVICE AND METHOD FOR PERFORMING RADIO COMMUNICATION

(71) Applicant: Apple Inc., Cupertino, CA (US)

(72) Inventors: Thorsten Clevorn, Munich (DE); Pablo Herrero, Munich (DE); Uri Perlmutter, Holon (IL); Ronen Kronfeld, Shoham (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/137,021

(22) Filed: Apr. 25, 2016

(65) Prior Publication Data
US 2016/0301456 A1  Oct. 13, 2016

Related U.S. Application Data

(63) Continuation of application No. 14/062,982, filed on Oct. 25, 2013, now abandoned.
(Continued)

(51) Int. Cl.
*H04B 7/0456* (2017.01)
*H04B 7/08* (2006.01)
(Continued)

(52) U.S. Cl.
CPC .......... *H04B 7/0486* (2013.01); *H04B 7/04* (2013.01); *H04B 7/0689* (2013.01);
(Continued)

(58) Field of Classification Search
CPC .......... H04B 1/005; H04B 1/406; H04B 1/48; H04B 1/0053; H04B 1/006; H04B 7/0486;
(Continued)

(56) References Cited

U.S. PATENT DOCUMENTS 5,854,611 A * 12/1998 Gans ............... H01Q 23/00
                                                      342/373
9,049,745 B2   6/2015 Mujtaba et al.
(Continued)

FOREIGN PATENT DOCUMENTS

CN       101313476 A     11/2008
CN       102007698 A      4/2011
(Continued)

OTHER PUBLICATIONS

Non-final Office Action received for the corresponding U.S. Appl. No. 14/062,982, dated Dec. 22, 2016 (14 Pages).
(Continued)

*Primary Examiner* — Sung S Ahn
(74) *Attorney, Agent, or Firm* — Kowert, Hood, Munyon, Rankin & Goetzel, P.C.

(57) ABSTRACT

A communication device is described comprising a first antenna, a second antenna and a third antenna; a first transceiver configured to communicate using at least the first antenna; a second transceiver configured to communicate using at least the second antenna; and a controller configured to determine whether the third antenna is to be used by the first transceiver or the second transceiver based on a selection criterion and configured to control the first transceiver to communicate using the first antenna and the third antenna if the controller has determined that the third antenna is to be used by the first transceiver and to control the second transceiver to communicate using the second antenna and the third antenna if the controller has determined that the third antenna is to be used by the second transceiver.

17 Claims, 8 Drawing Sheets

Related U.S. Application Data

(60) Provisional application No. 61/827,029, filed on May 24, 2013.

(51) Int. Cl.

| | | |
|---|---|---|
| *H04B 7/06* | (2006.01) | |
| *H04B 7/04* | (2017.01) | |
| *H04L 5/00* | (2006.01) | |
| *H04W 72/04* | (2009.01) | |
| *H04W 72/08* | (2009.01) | |
| *H04W 88/06* | (2009.01) | |

(52) U.S. Cl.
CPC ......... *H04B 7/0693* (2013.01); *H04B 7/0871* (2013.01); *H04B 7/0877* (2013.01); *H04L 5/0023* (2013.01); *H04W 72/046* (2013.01); *H04W 72/085* (2013.01); *H04W 88/06* (2013.01)

(58) Field of Classification Search
CPC ...... H04B 7/04; H04B 7/0693; H04B 7/0871; H04B 7/0877; H04L 5/0023; H04W 72/046; H04W 72/085; H04W 88/06
See application file for complete search history.

(56) References Cited

U.S. PATENT DOCUMENTS

| | | | |
|---|---|---|---|
| 2005/0014472 A1* | 1/2005 | Cox ........................ | H04B 1/48 455/82 |
| 2008/0238794 A1 | 10/2008 | Pan et al. | |
| 2008/0261647 A1 | 10/2008 | Hamada | |
| 2009/0262669 A1* | 10/2009 | Sanders ................. | H04B 1/006 370/278 |
| 2010/0260147 A1* | 10/2010 | Xing ...................... | H04K 3/226 370/332 |
| 2010/0267415 A1 | 10/2010 | Kakitsu et al. | |
| 2012/0044919 A1* | 2/2012 | Medapalli .............. | H04B 1/406 370/338 |
| 2012/0093009 A1 | 4/2012 | Wang et al. | |
| 2012/0302283 A1 | 11/2012 | Sun | |
| 2013/0072135 A1 | 3/2013 | Banerjea et al. | |
| 2014/0273884 A1* | 9/2014 | Mantravadi ............. | H04B 1/38 455/73 |
| 2014/0376417 A1* | 12/2014 | Khlat ................... | H04B 1/0064 370/277 |

FOREIGN PATENT DOCUMENTS

| | | |
|---|---|---|
| CN | 102802283 A | 11/2012 |
| CN | 105075129 A | 11/2015 |
| JP | 2013051646 A | 3/2013 |
| JP | 2013509847 A | 3/2013 |
| WO | 2009128860 A1 | 10/2009 |
| WO | 2011042051 A1 | 4/2011 |
| WO | 2011053997 A2 | 5/2011 |
| WO | 2011084715 A1 | 7/2011 |
| WO | 2013048511 A1 | 4/2013 |
| WO | 2014163750 A1 | 10/2014 |

OTHER PUBLICATIONS

Final Office Action received for the corresponding U.S. Appl. No. 14/062,982, dated May 17, 2017 (22 Pages).

Chinese Office Action based on application No. 201410220710.5 (12 pages) dated Mar. 1, 2017 (Reference Purpose Only).

Non-Final Office Action received for the corresponding U.S. Appl. No. 14/062,982 (16 Pages) dated Sep. 14, 2017.

Chinese Office Action based on application No. 201410220710.5 (3 pages and 5 pages of English Translation) dated Aug. 28, 2017 (Reference Purpose Only).

German Office Action based on application No. 10 2014 104 197.6 (10 pages) dated Aug. 25, 2017 (Reference Purpose Only).

Supplementary Search Report issued for corresponding application No. 201610253209.8, dated Aug. 5, 2019, 2 pages (for informational purpose only).

* cited by examiner

COMMUNICATION DEVICE AND METHOD FOR PERFORMING RADIO COMMUNICATION

CROSS-REFERENCE TO RELATED APPLICATION

This application is a continuation of U.S. Ser. No. 14/062,982, filed Oct. 25, 2013, which claims the benefit of U.S. provisional patent application No. 61/827,029, filed May 24, 2013, all of which are hereby incorporated by reference in its entirety.

TECHNICAL FIELD

Embodiments described herein generally relate to communication devices and methods for performing radio communication.

BACKGROUND

Today's mobile communication devices (such as smartphones, tablets, notebooks etc.) may support multiple Radio Access Technologies (RATs) like WLAN (Wireless Local Area Network), Bluetooth, GPS (Global Positioning System), GSM (Global System for Mobile Communications), UMTS (Universal Mobile Telecommunication System), LTE (Long Term Evolution) etc. For the reception and transmission of wireless signals using a certain RAT a communication device needs an antenna. For high-data speed or improved reception with technologies like Receive Diversity or Transmit Diversity or MIMO (Multiple Input Multiple Output) even multiple antennas may be needed for a certain RAT, e.g. LTE or WLAN.

However, the available space in a mobile communication device is typically very limited and often not sufficient to place a higher number of antennas. A reduction of the size of the antennas may not be possible or may be undesirable since it may reduce the antennas' performance significantly. Furthermore, each antenna that is incorporated in a mobile communication device generates additional cost during production of the mobile communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
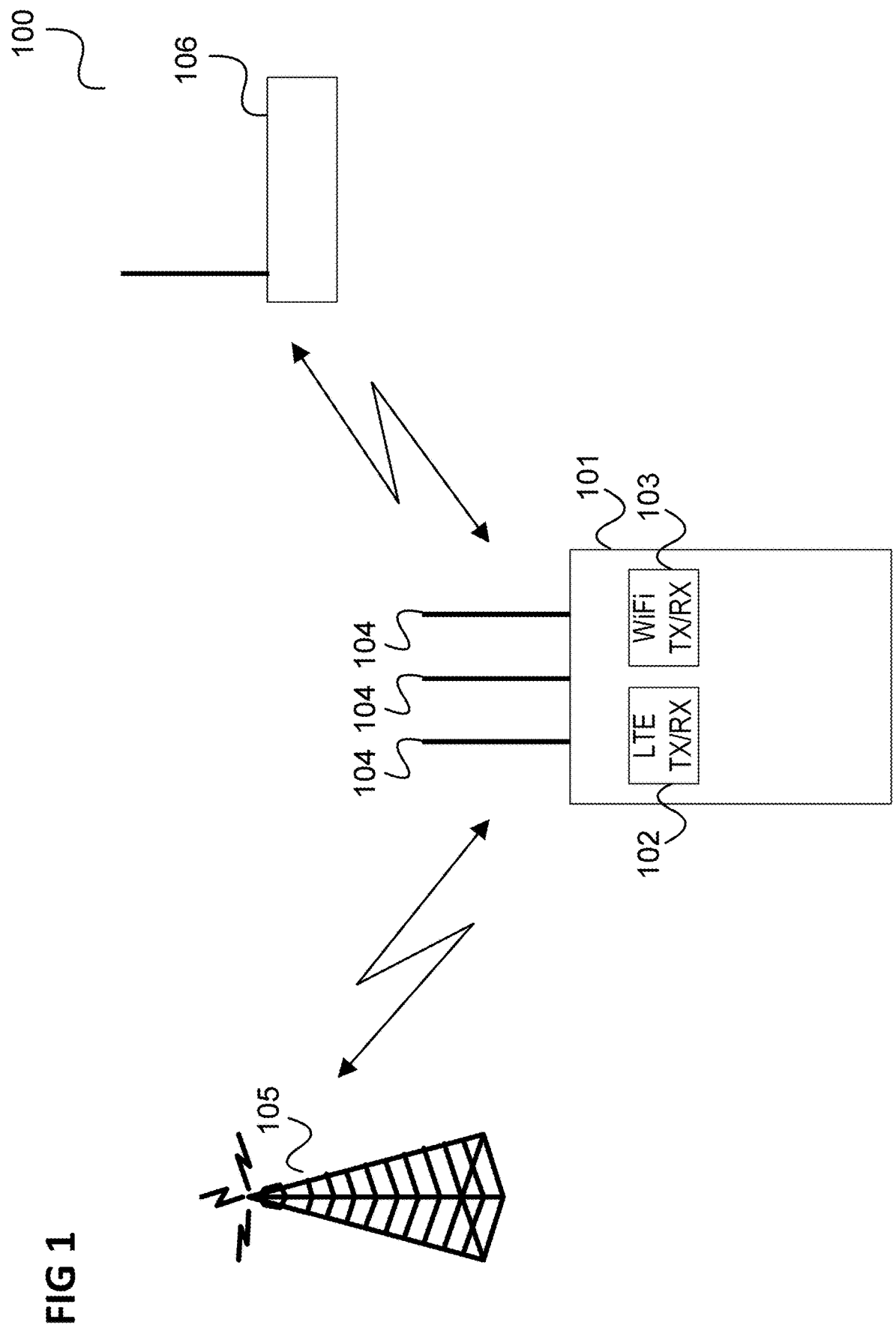
FIG. 1 shows a communication arrangement.

FIG. 1 shows a communication arrangement 100.

The communication arrangement 100 includes a mobile communication device 101 (such as a smartphone, a tablet, a notebooks etc) which supports two (or more) radio access technologies (RATs), in this example LTE (Long Term Evolution) and WiFi (or, in other words, WLAN). For this, the mobile communication device 101, also referred to as mobile terminal, includes a first transceiver 102, in this example an LTE transceiver and a second transceiver 103, in this example a WiFi transceiver.

The mobile communication device 101 further comprises a plurality of antennas 104. By means of one or more of the antennas 104, the LTE transceiver 102 may communicate with an LTE base station 105 and the WiFi transceiver 103 may communicate with a WLAN (Wireless Local Area Network) access point 106.

It should be noted that LTE and WiFi are only examples and other RATs may be used such as UMTS (Universal Mobile Telecommunications System), GSM (Global System for Mobile Communications), Bluetooth, GPS (Global Positioning System) etc.

The RATs, in this example LTE and WiFi may support technologies that require the usage of more than one antenna, for example MIMO (Multiple Input Multiple Output). To provide both transceivers 102, 103 with a sufficient number for such technologies while not including a high number of antennas, which may be undesirable, e.g. due to space restrictions, an antenna may be used (uncontrolled) in parallel by a plurality of RATs. However, due to the possible interaction between the signals of the different RATs and the lack of tuning the antenna to a specific RAT the reception performance may be degraded.

As described in the following, according to one example, a communication device provided in which one or more antennas may be shared between RATs (which each request multiple antennas) by switching it between the RATs in a controlled manner. RATs such as LTE and WiFi typically require multiple antennas only for high-speed data reception or transmission or under bad radio conditions. However, it is unlikely that multiple RATs do a high-speed data reception or transmission at the same time. In case that multiple RATs experience degrading radio conditions a priority decision could be taken which RAT is more important and is assigned a shared antenna.

Figure 2:
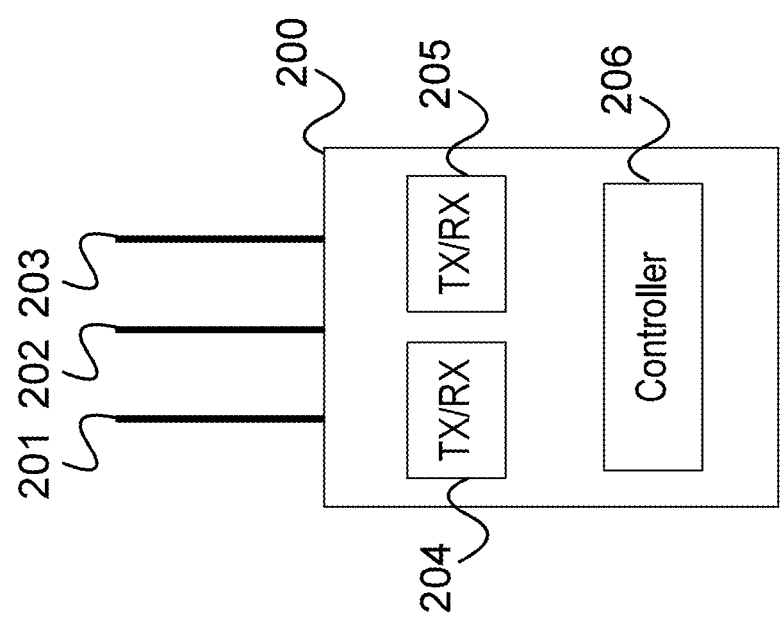
FIG. 2 shows a communication device.

FIG. 2 shows a communication device 200.

The communication device 200 comprises a first antenna 201, a second antenna 202 and a third antenna 203, a first transceiver 204 configured to communicate using at least the first antenna 201 and a second transceiver 205 configured to communicate using at least the second antenna 202.

The communication device 200 further comprises a controller 206 configured to determine whether the third antenna 203 is to be used by the first transceiver 204 or the second transceiver 205 based on a selection criterion and configured to control the first transceiver 204 to communicate using the first antenna 201 and the third antenna 203 if the controller 206 has determined that the third antenna 203 is to be used by the first transceiver 204 and to control the second transceiver 205 to communicate using the second antenna 202 and the third antenna 203 if the controller 206 has determined that the third antenna 203 is to be used by the second transceiver 205.

In other words, an antenna (in this example the third antenna) may be shared between different transceivers (e.g. operating according to different RATs) in the sense that it is decided based on a certain criterion which transceiver may use the antenna (in addition to the one or more antennas that are assigned to the transceiver anyway). The criterion may for example be based on a required quality of the communication of the first transceiver and the communication of the second transceiver (e.g. a required throughput, robustness, Quality of Service, latency etc.), on a priority of the first transceiver and a priority of the second transceiver and/or the current radio conditions that the transceiver experiences. For example, the transceiver which experiences the worse radio conditions is assigned with the shared antenna. Worse radio conditions may for example mean a higher risk of a lost communication connection or a higher bit error rate or packet error rate, a lower signal-to-noise ratio etc.

Figure 3:
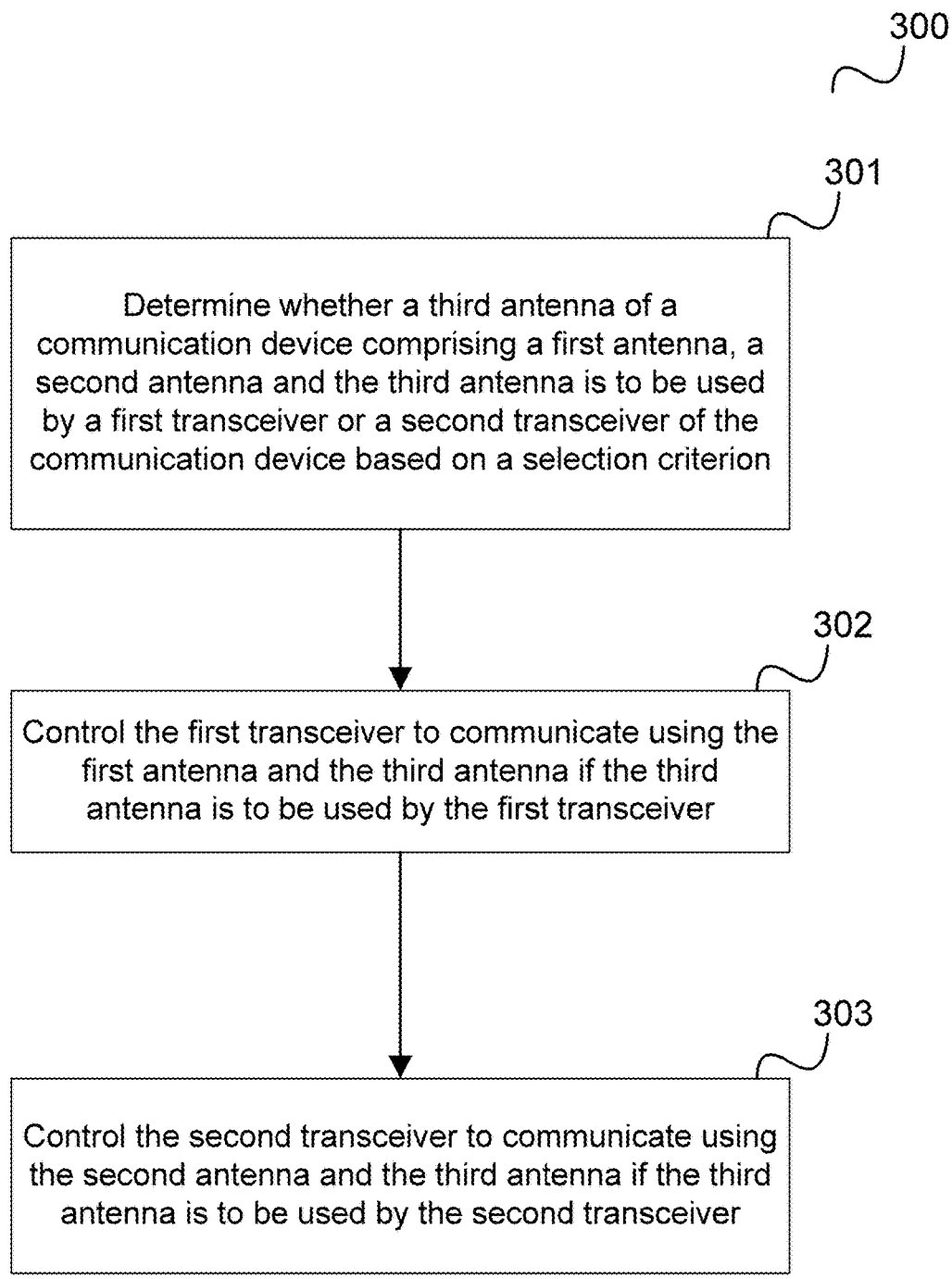
FIG. 3 shows a flow diagram illustrating a method for performing radio communication.

The communication device 200 for example carries out a method as illustrated in FIG. 3.

FIG. 3 shows a flow diagram 300.

The flow diagram 300 illustrates a method for performing radio communication, for example carried out by a controller of a communication device.

In 301, the controller determines whether a third antenna of the communication device which comprises a first antenna, a second antenna and the third antenna is to be used by a first transceiver or a second transceiver of the communication device based on a selection criterion.

In 302, the controller controls the first transceiver to communicate using the first antenna and the third antenna if the third antenna is to be used by the first transceiver.

In 302, the controller controls the second transceiver to communicate using the second antenna and the third antenna if the third antenna is to be used by the second transceiver.

The following examples pertain to further embodiments.

Example 1, as described with respect to FIG. 2, is a communication device comprising a first antenna, a second antenna and a third antenna; a first transceiver configured to communicate using at least the first antenna; a second transceiver configured to communicate using at least the second antenna; and a controller configured to determine whether the third antenna is to be used by the first transceiver or the second transceiver based on a selection criterion and configured to control the first transceiver to communicate using the first antenna and the third antenna if the controller has determined that the third antenna is to be used by the first transceiver and to control the second transceiver to communicate using the second antenna and the third antenna if the controller has determined that the third antenna is to be used by the second transceiver.

In Example 2, the subject matter of Example 1 can optionally include the first transceiver being configured to communicate according to a first radio access technology and the second transceiver being configured to communicate according to a second radio access technology different from the first radio access technology.

In Example 3, the subject matter of Examples 1-2 can optionally include the first transceiver including a first baseband circuit and the second transceiver including a second baseband circuit.

In Example 4, the subject matter of Examples 1-3 can optionally include the controller being configured to control the first transceiver to communicate using the first antenna and the third antenna and the second transceiver to communicate simultaneously using the second antenna if the controller has determined that the third antenna is to be used by the first transceiver and to control the second transceiver to communicate using the second antenna and the third antenna and the first transceiver to communicate simultaneously using the first antenna if the controller has determined that the third antenna is to be used by the second transceiver.

In Example 5, the subject matter of Examples 1-4 can optionally include the controller being configured to determine whether the third antenna is to be used by the first transceiver or the second transceiver based on a quality requirement of the communication of the first transceiver and a quality requirement of the communication of the second transceiver.

In Example 6, the subject matter of Example 5 can optionally include the controller being configured to determine that the third antenna is to be used by the first transceiver if the quality requirement of the communication of the first transceiver is higher than the quality requirement of the communication of the second transceiver and to determine that the third antenna is to be used by the second transceiver if the quality requirement of the communication of the second transceiver is higher than the quality requirement of the communication of the first transceiver.

In Example 7, the subject matter of Examples 5-6 can optionally include the quality requirement being a throughput requirement or a robustness requirement or a combination of both.

In Example 8, the subject matter of Examples 1-7 can optionally include the controller being configured to determine whether the third antenna is to be used by the first transceiver or the second transceiver based on a priority of the communication of the first transceiver and a priority of the communication of the second transceiver.

In Example 9, the subject matter of Examples 1-8 can optionally include the controller being configured to determine whether the third antenna is to be used by the first transceiver or the second transceiver based on radio conditions of the communication of the first transceiver and based on radio conditions of the communication of the second transceiver.

In Example 10, the subject matter of Example 9 can optionally include the controller being configured to determine that the third antenna is to be used by the first transceiver if the radio conditions of the communication of the first transceiver are worse than the radio conditions of the communication of the second transceiver and to determine that the third antenna is to be used by the second transceiver if the radio conditions of the communication of the second transceiver are worse than the radio conditions of the communication of the first transceiver.

In Example 11, the subject matter of Examples 1-10 can optionally include the controller being configured to control the first transceiver to perform a MIMO communication using the first antenna and the third antenna if the controller has determined that the third antenna is to be used by the first transceiver and to control the second transceiver to perform a MIMO communication using the second antenna and the third antenna if the controller has determined that the third antenna is to be used by the second transceiver.

In Example 12, the subject matter of Examples 1-11 can optionally include the communication device being a communication terminal.

In Example 13, the subject matter of Examples 1-12 can optionally include the communication device being a subscriber terminal of a mobile cellular radio communication system and the first transceiver is configured to communicate with a base station of the mobile cellular radio communication system.

In Example 14, the subject matter of Examples 1-13 can optionally include the second transceiver being configured to communicate with an access point of a wireless local area network.

In Example 15, the subject matter of Examples 1-14 can optionally include the controller being configured to control the first transceiver to perform downlink communication using the first antenna and the third antenna if the controller has determined that the third antenna is to be used by the first transceiver and to control the second transceiver to perform downlink communication using the second antenna and the third antenna if the controller has determined that the third antenna is to be used by the second transceiver.

In Example 16, the subject matter of Examples 1-15 can optionally include the controller being configured to control the first transceiver to perform downlink communication using the first antenna and the third antenna and the second transceiver to simultaneously perform downlink communication using the second antenna if the controller has determined that the third antenna is to be used by the first transceiver and to control the second transceiver to perform downlink communication using the second antenna and the third antenna and the first transceiver to simultaneously perform downlink communication using the first antenna if the controller has determined that the third antenna is to be used by the second transceiver.

In Example 17, the subject matter of Examples 1-16 can optionally include the controller being configured
- to determine whether the third antenna is to be used by the first transceiver or the second transceiver for downlink communication;
- to control the first transceiver to perform downlink communication using the first antenna and the third antenna if the controller has determined that the third antenna is to be used by the first transceiver for downlink communication;
- to control the second transceiver to perform downlink communication using the second antenna and the third antenna if the controller has determined that the third antenna is to be used by the second transceiver for downlink communication;
- to determine whether the third antenna is to be used by the first transceiver or the second transceiver for uplink communication;
- to control the first transceiver to perform uplink communication using the first antenna and the third antenna if the controller has determined that the third antenna is to be used by the first transceiver for uplink communication; and
- to control the second transceiver to perform uplink communication using the second antenna and the third antenna if the controller has determined that the third antenna is to be used by the second transceiver for uplink communication.

In Example 18, the subject matter of Examples 1-17 can optionally include the first transceiver being configured to communicate with a first device and the second transceiver being configured to communicate with a second device different from the first device.

In Example 19, the subject matter of Examples 1-18 can optionally include the first device being a base station of a cellular mobile communication network.

In Example 20, the subject matter of Examples 1-19 can optionally include the second device being a communication terminal and the communication device being configured to provide the second device with a communication connection to the cellular mobile communication network by means of the first transceiver and the second transceiver.

Example 21, as described with respect to FIG. 3, is a method for performing radio communication comprising determining whether a third antenna of a communication device comprising a first antenna, a second antenna and the third antenna is to be used by a first transceiver or a second transceiver of the communication device based on a selection criterion; controlling the first transceiver to communicate using the first antenna and the third antenna if the third antenna is to be used by the first transceiver; and controlling the second transceiver to communicate using the second antenna and the third antenna if the third antenna is to be used by the second transceiver.

In Example 22, the subject matter of Example 21 can optionally include the first transceiver communicating according to a first radio access technology and the second transceiver communicating according to a second radio access technology different from the first radio access technology.

In Example 23, the subject matter of Examples 21-22 can optionally include the first transceiver including a first baseband circuit and the second transceiver including a second baseband circuit.

In Example 24, the subject matter of Examples 21-23 can optionally include controlling the first transceiver to communicate using the first antenna and the third antenna and the second transceiver to communicate simultaneously using the second antenna if the third antenna is to be used by the first transceiver and controlling the second transceiver to communicate using the second antenna and the third antenna and the first transceiver to communicate simultaneously using the first antenna if the third antenna is to be used by the second transceiver.

In Example 25, the subject matter of Examples 21-24 can optionally include determining whether the third antenna is to be used by the first transceiver or the second transceiver based on a quality requirement of the communication of the first transceiver and a quality requirement of the communication of the second transceiver.

In Example 26, the subject matter of Example 25 can optionally include determining that the third antenna is to be used by the first transceiver if the quality requirement of the communication of the first transceiver is higher than the quality requirement of the communication of the second transceiver and to determine that the third antenna is to be used by the second transceiver if the quality requirement of the communication of the second transceiver is higher than the quality requirement of the communication of the first transceiver.

In Example 27, the subject matter of Examples 25-26 can optionally include the quality requirement being a throughput requirement or a robustness requirement or a combination of both.

In Example 28, the subject matter of Examples 21-27 can optionally include determining whether the third antenna is to be used by the first transceiver or the second transceiver based on a priority of the communication of the first transceiver and a priority of the communication of the second transceiver.

In Example 29, the subject matter of Examples 21-28 can optionally include determining whether the third antenna is to be used by the first transceiver or the second transceiver based on radio conditions of the communication of the first transceiver and based on radio conditions of the communication of the second transceiver.

In Example 30, the subject matter of Example 29 can optionally include determining that the third antenna is to be used by the first transceiver if the radio conditions of the communication of the first transceiver are worse than the radio conditions of the communication of the second transceiver and determining that the third antenna is to be used by the second transceiver if the radio conditions of the communication of the second transceiver are worse than the radio conditions of the communication of the first transceiver.

In Example 31, the subject matter of Examples 21-30 can optionally include controlling the first transceiver to perform a MIMO communication using the first antenna and the third antenna if the third antenna is to be used by the first transceiver and controlling the second transceiver to perform a MIMO communication using the second antenna and the third antenna if the third antenna is to be used by the second transceiver.

In Example 32, the subject matter of Examples 21-31 can optionally include the communication device being a communication terminal.

In Example 33, the subject matter of Examples 21-32 can optionally include the communication device being a subscriber terminal of a mobile cellular radio communication system and the first transceiver being configured to communicate with a base station of the mobile cellular radio communication system.

In Example 34, the subject matter of Examples 21-33 can optionally include the second transceiver being configured to communicate with an access point of a wireless local area network.

In Example 35, the subject matter of Examples 21-34 can optionally include controlling the first transceiver to perform downlink communication using the first antenna and the third antenna if the third antenna is to be used by the first transceiver and controlling the second transceiver to perform downlink communication using the second antenna and the third antenna if the third antenna is to be used by the second transceiver.

In Example 36, the subject matter of Examples 21-35 can optionally include controlling the first transceiver to perform downlink communication using the first antenna and the third antenna and the second transceiver to simultaneously perform downlink communication using the second antenna if the third antenna is to be used by the first transceiver and controlling the second transceiver to perform downlink communication using the second antenna and the third antenna and the first transceiver to simultaneously perform downlink communication using the first antenna if the third antenna is to be used by the second transceiver.

In Example 37, the subject matter of Examples 21-36 can optionally include
   determining whether the third antenna is to be used by the first transceiver or the second transceiver for downlink communication
   controlling the first transceiver to perform downlink communication using the first antenna and the third antenna if the third antenna is to be used by the first transceiver for downlink communication
   controlling the second transceiver to perform downlink communication using the second antenna and the third antenna if the third antenna is to be used by the second transceiver for downlink communication
   determining whether the third antenna is to be used by the first transceiver or the second transceiver for uplink communication;
   controlling the first transceiver to perform uplink communication using the first antenna and the third antenna if the third antenna is to be used by the first transceiver for uplink communication; and
   controlling the second transceiver to perform uplink communication using the second antenna and the third antenna if the third antenna is to be used by the second transceiver for uplink communication.

In Example 38, the subject matter of Examples 21-37 can optionally include the first transceiver communicating with a first device and the second transceiver communicating with a second device different from the first device.

In Example 39, the subject matter of Examples 21-38 can optionally include the first device being a base station of a cellular mobile communication network.

In Example 40, the subject matter of Examples 21-39 can optionally include the second device being a communication terminal and the communication device providing the second device with a communication connection to the cellular mobile communication network by means of the first transceiver and the second transceiver.

Example 41 is a computer readable medium having recorded instructions thereon which, when executed by a processor, make the processor perform a method for performing radio communication according to any one of Examples 21 to 40.

In the following, a detailed example is described with reference to the communication arrangement 100 shown in FIG. 1, i.e. in which an LTE transceiver 102 and a WiFi transceiver 103 share one of the antennas 104 as both RATs can employ MIMO and support high-speed data. The approach described with reference to FIGS. 2 and 3 may also be applied to other RATs like Bluetooth, GPS, UMTS, GSM, etc. and extended to more than one shared antenna.

Figure 4:
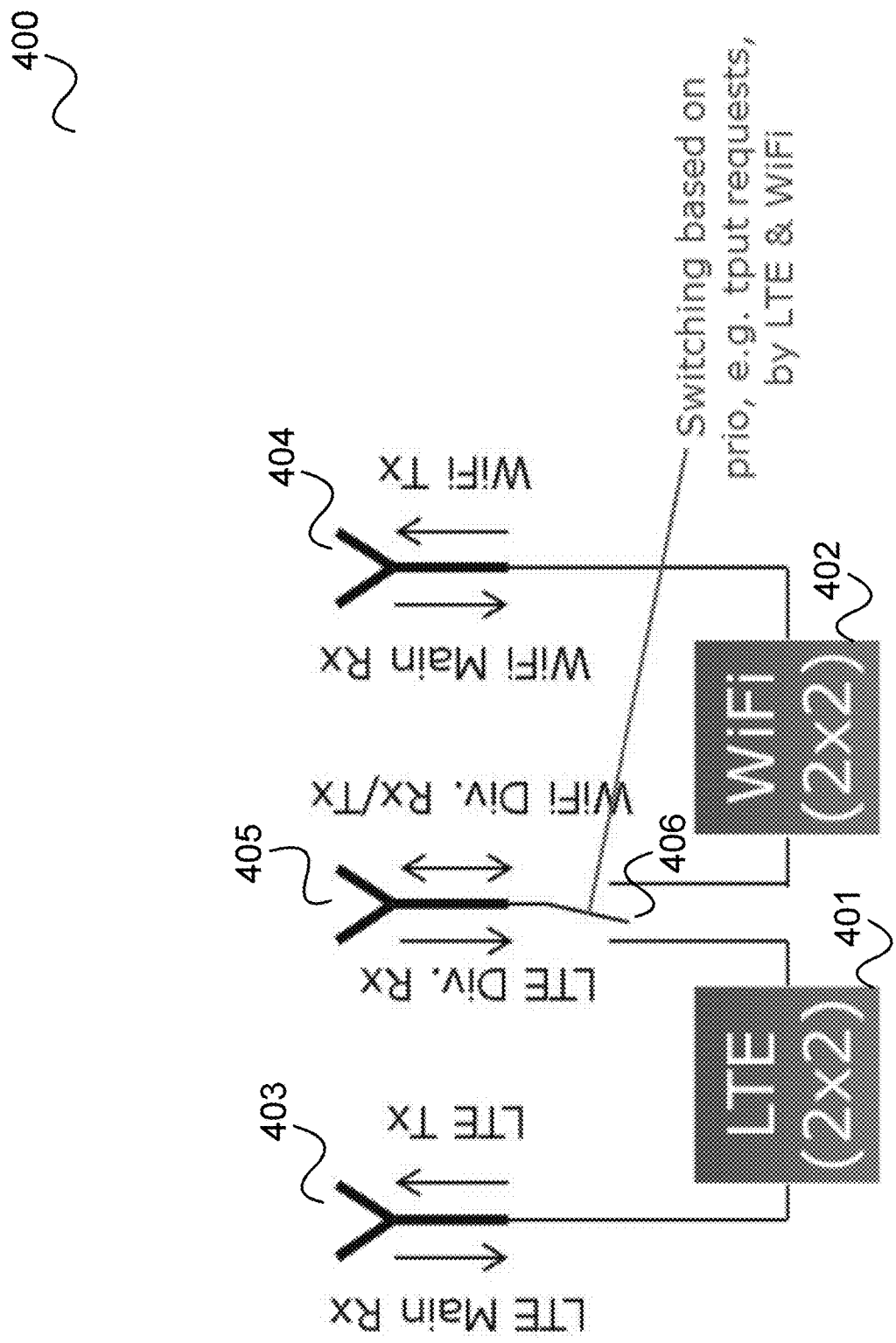
FIG. 4 shows a transceiver arrangement with an LTE transceiver and a WLAN transceiver sharing an antenna.

FIG. 4 shows a transceiver arrangement 400.

The transceiver arrangement 400 includes an LTE transceiver 401 corresponding to the LTE transceiver 102 and a WiFi transceiver 402 corresponding to the WiFi transceiver 103. The transceiver arrangement 400 further includes a first antenna 403, a second antenna 404 and a third antenna 405 which correspond to the antennas 104. In this example, the first antenna 403 is permanently assigned to the LTE transceiver 401, the second antenna 404 is permanently assigned to the WiFi transceiver 402 and the third antenna 405 is a shared antenna which may be switched between the LTE transceiver 401 and the WiFi transceiver 402 by means of a switch 406. Both transceivers 401, 402 in this example support 2×2 MIMO (i.e. MIMO with two transmit antennas and two receive antennas) for reception, i.e. for downlink transmission from the base station 105 and the access point 106 to the mobile communication device 101.

The transceiver 401, 402 which uses only a single antenna has a slightly degraded performance compared to the other transceiver 401, 402 since it may not use two antennas for MIMO. In the following, examples are given how a controller of the mobile communication device 101 may decide to which transceiver 401, 402 the shared antenna 405 is assigned such that that both RATs (i.e. transceivers 401, 402) still can perform well.

For example, a controller of the mobile communication device 101 switches the shared antenna 405 by means of controlling the switch 406 according to a smart control mechanism which takes various parameters into account. For example the controller can:

a) detect which RAT (in other words which transceiver 401, 402) requires the higher data rate and assign the shared antenna to this RAT (i.e. the corresponding transceiver 401, 402). If the mobile communication device 101 has an active WLAN (i.e. WiFi) connection e.g. when its user is at home or at work typically the WLAN connection provides a higher data rate than an LTE connection and the mobile communication device 101 typically uses the WLAN connection, e.g. for video streaming. When the mobile communication device 101 leaves WLAN coverage and for example scans for an accessible WLAN, it may perform a high-speed data transfer (such as video streaming) via LTE and the controller may for this switch the shared antenna 405 to LTE.

b) detect that a certain RAT is in degrading radio conditions and assign the shared antenna 405 to this RAT to improve the reception performance of this RAT to keep the corresponding communication connection (i.e. to avoid a connection loss). For example, in the basement of a house the WLAN radio conditions may still be good (perhaps with an WLAN hot spot or repeater) but due to the walls the LTE reception may be degraded and close to a connection loss. In this case, the controller could switch the shared antenna 405 to LTE to keep the connection. On the other hand, when the user leaves his home (or the office or goes in the back of his garden) with his mobile communication device 101 the LTE coverage may be good but the reception of his WLAN may degrade and the controller may decide to switch the shared antenna 405 to WLAN, i.e. to the WLAN transceiver 402.

c) take parameters not originating from the two RATs into account like:

The traffic types generated by the user like browsing, streaming, voice call, file download and their routing/distribution to the RATs.

User preference (e.g. configured in a menu, possibly with different thresholds like "neutral", "small preference for RAT 1 or 2", "high preference"). This preference may also be configured by a network operator (e.g. the LTE communication network operator to which the base station 105 belongs) or the device manufacturer of the mobile communication device 101, e.g. based on their wishes or capabilities regarding WLAN off-loading.

Location information (provided by a GNSS (Global Navigation Satellite System), WLAN IDs, LTE cell IDs etc.) which might e.g. indicate that WLANs preferred by the user (e.g. a home WLAN, or an office WLAN etc.) are nearby or indicate a location with known bad LTE coverage.

Information (such as the information given in the items above) based e.g. on a historic collection of the mobile communication device 101, on a central database or on some other information available in the mobile communication device like calendar entries indicating a location.

d) take into account the request of a transceiver 401, 402 for multiple antennas which may also depend on a dynamic receive or transmit diversity scheme employed by the transceiver which switches on/off (or requests the switching) of antennas, e.g. a diversity antenna based on its own status like good/bad conditions, dedicated packets being received, etc. For example, in case one transceiver 401, 402 requests only a single antenna anyway (e.g. because of good conditions), the controller may assign the shared antenna 405 to the other transceiver 401, 402.

The controller may carry out its decision (or determination) also on a combination of the above items and parameters.

The controller may also carry out its decision depending on whether the transceivers 401, 402 are idle or have an active connection. For example, instead of both transceivers 401, 402 having (or establishing) active connections and the controller deciding to which transceiver 401, 402 the shared antenna 405 should be assigned for the active connections, the controller may also decide to which transceiver 401, 402 the shared antenna 405 should be assigned in case one or both of the transceivers 401, 402 are in idle mode. For example, in idle mode typically reception gaps (e.g. in a DRX (discontinuous reception) scheme) are used for a RAT to save power. In this case the controller may switch the shared antenna 405 in a reception gap of one RAT to the other RAT since it is not needed for the RAT with the reception gap.

As further example is described in the following. It is assumed that the mobile communication device 101 has a VoLTE voice call via LTE and, in parallel, a WiFi connection. In this case, the controller may differentiate between sporadic WLAN traffic like for browsing and continuous WLAN like for video streaming.

For sporadic (e.g. browsing) traffic the controller may for example assign the shared antenna 405 to the first transceiver 401, in other words the VoLTE voice call. The controller may for example switch the shared antenna 405 for short a time period to the second transceiver 402 for the sporadic WLAN traffic. After this time periods, the controller switches the antenna 405 back to LTE for an efficient use of the network capacity.

With a high-rate video streaming via WiFi, for example, the controller may assign the shared antenna to the WiFi transmitter 402 as the low rate VoLTE call can be supported by a single antenna in good radio conditions. However, if the controller detects bad LTE radio conditions it may decide to switch the shared antenna to LTE to avoid a call drop by the enhanced reception offered by the diversity achieved when using a plurality of antennas, to e.g. ensure that the call kept on LTE or is properly handed over to another communication network, e.g. a 2G or 3G communication network.

When switching antennas between RATs the controller may consider which transmission schemes the RATs employ. If a RAT (LTE, WLAN etc.) employs e.g. 2×2 MIMO then two antennas are needed for reception to decode the two MIMO streams. However, in practical application the transmission paths of the two antennas may have a high correlation such that only a single MIMO stream may be efficiently supported. To control the transmission the mobile communication device 101 may report a parameter like the rank of the MIMO channel matrix to the transmitter (in this case the base station 105). A rank of 2 indicates that two MIMO streams are possible (with two antennas needed) while a rank of 1 indicates the request for a single MIMO stream which can be decoded with a single antenna with a small performance degradation compared to the usage of two antennas.

In the following an example is given how this rank reporting can be used by the mobile communication device 101 to configure the MIMO schemes employed at the transmitters of the RATs. As an example, the case of an LTE link running with rank 2 and a WLAN link requesting the shared antenna 405 is used. The RATs may also be reversed or this may also be applied to other RAT combinations.

First, a scenario is assumed in which the mobile communication device 101 has a VoLTE voice call via LTE and, in parallel, performs video streaming via WiFi. It is assumed that the radio conditions for LTE are good. The flow is illustrated in FIG. 5.

Figure 5:
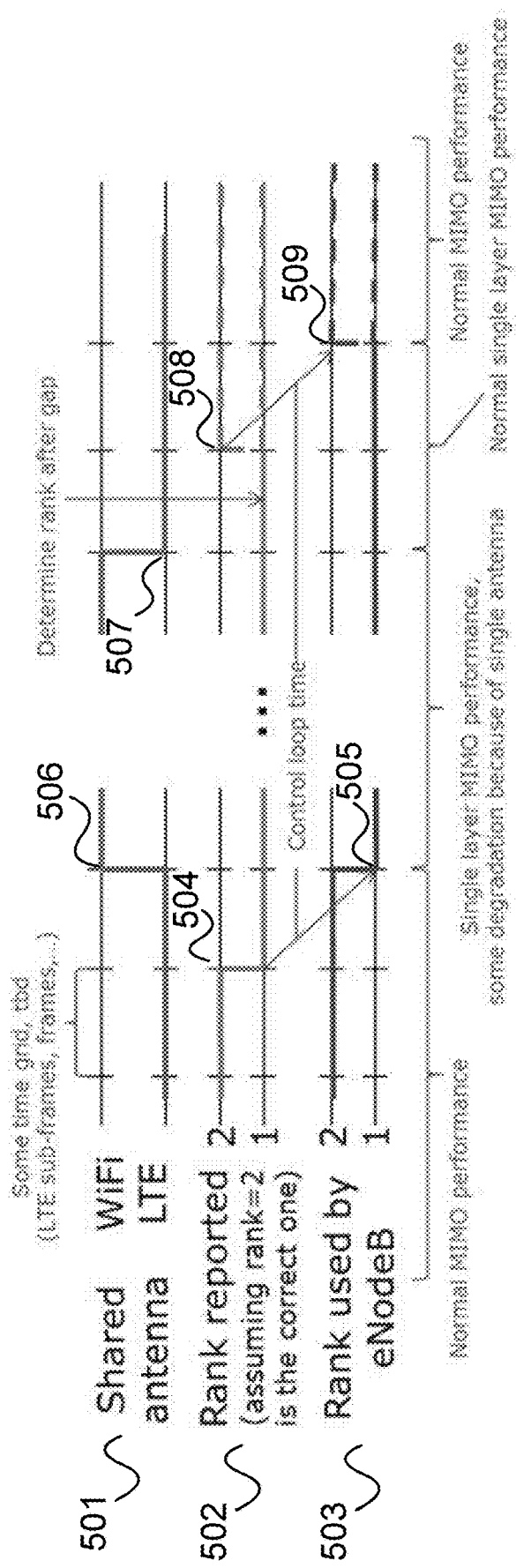
FIG. 5 shows a signal diagram illustrating a scenario in which a shared antenna is switched from LTE to WLAN for a period of unknown length.

FIG. 5 shows a signal diagram 500.

In the signal diagram 500, time flows from left to right and the assignment of the shared antenna 405 is shown in a first sub-diagram 501, the MIMO channel matrix rank reported by the LTE transceiver 401 is shown in a second sub-diagram 502 and the MIMO channel matrix rank used by the base station 105 (i.e. the number of streams transmitted) is shown in a third sub-diagram 503.

At first, the shared antenna 405 is assigned to LTE and, due to the good LTE radio conditions, the LTE transceiver 401 reports rank 2 to efficiently use the network capacity.

At the start of the video stream the WiFi transceiver 402 requests the shared antenna 405 for a long period of unknown length.

Before the shared antenna 405 is switched to WLAN the LTE fakes rank 1 in its report to the base station 105 starting on a first point in time 504 so that the base station 105 changes the transmission to a rank 1 MIMO transmission at a second point in time 505, which can be received with a single antenna by the LTE receiver. Only then the antenna is switched to WLAN at a third point in time 505.

When the Video stream stops and the WLAN transceiver 402 releases (i.e. no longer uses) the shared antenna 405, the controller switches the shared antenna 405 back to LTE at a fourth point in time 507. The LTE transceiver 401 then measures the real rank of the MIMO channel matrix and then starts reporting the correct rank (1 or 2) at a fifth point in time 508. For example, in case rank 2 is reported the base station 105 continues transmission using two streams at a sixth point in time 509.

As second example, a scenario is assumed in which the WLAN transmitter 402 only requests the shared antenna 405, e.g. for short browsing data transfer, for a period with a known short length. This is illustrated in FIG. 6.

Figure 6:
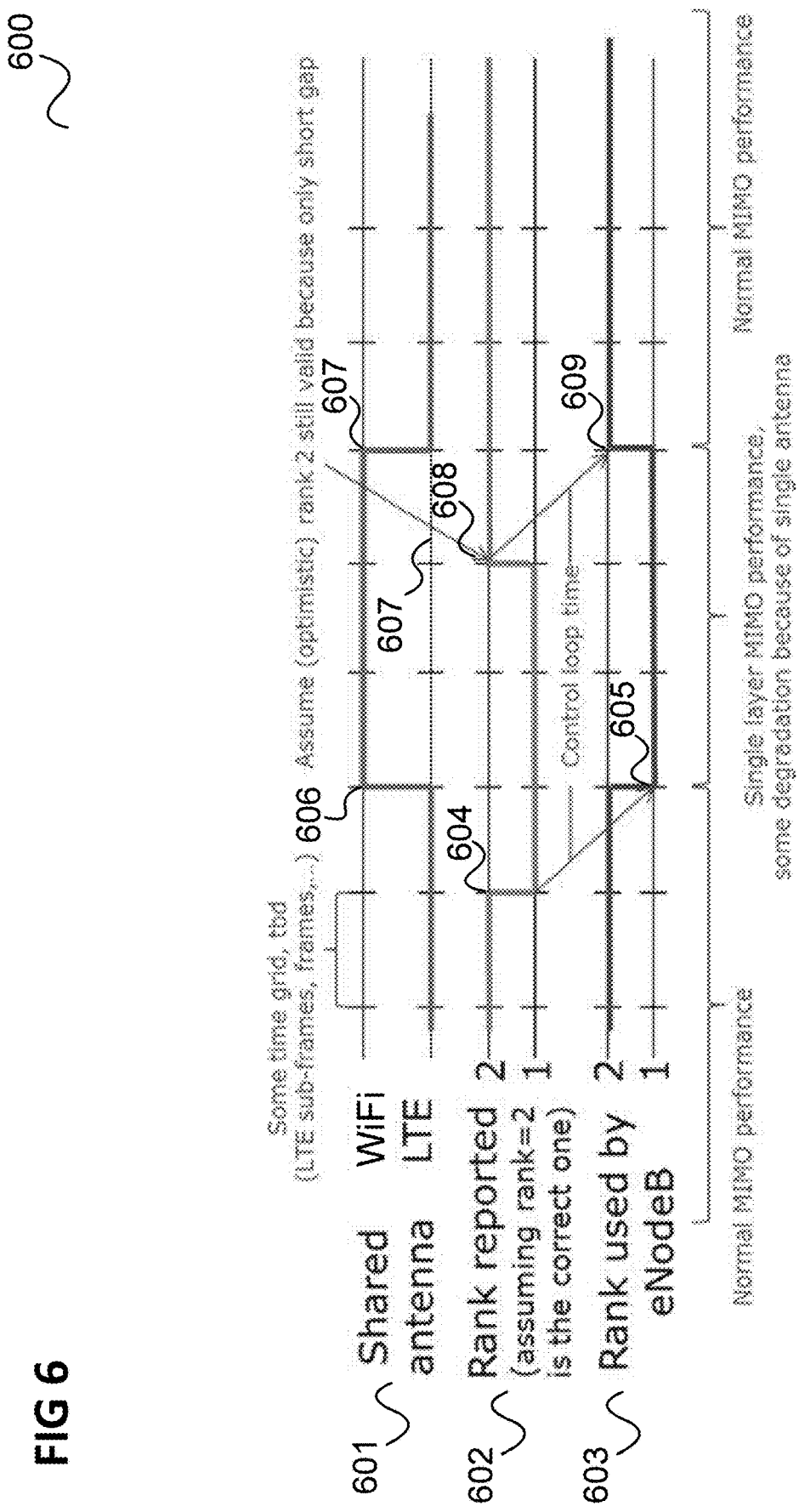
FIG. 6 shows a signal diagram in which a shared antenna is switched from LTE to WLAN for a short period of known length.

FIG. 6 shows a signal diagram 600.

In the signal diagram 600, time flows from left to right and the assignment of the shared antenna 405 is shown in a first sub-diagram 601, the MIMO channel matrix rank reported by the LTE transceiver 401 is shown in a second sub-diagram 602 and the MIMO channel matrix rank used by the base station 105 (i.e. the number of streams transmitted) is shown in a third sub-diagram 603.

At first, the shared antenna 405 is assigned to LTE and, due to the good LTE radio conditions, the LTE transceiver 401 reports rank 2 to efficiently use the network capacity.

As in the first scenario described with reference to FIG. 5, the LTE transceiver 401 fakes rank 1 at a first point in time 604. The base station 105 changes the transmission to a rank 1 MIMO transmission at a second point in time 605, which can be received with a single antenna by the LTE receiver. Only then the antenna is switched to WLAN at a third point in time 606. After the short time period during which the WiFi transceiver 402 requires the shared antenna 405, the shared antenna 405 is switched back to LTE at a fourth point in time 607.

In contrast to the first scenario described with reference to FIG. 5, due to the short time period during which LTE does not have the shared antenna 405, the LTE transceiver 401 assumes that at the end of the period (when LTE gets back the second antenna) the rank 2 from before is still valid because of an only slowly changing channel and requests the base station 105 to use the rank 2 MIMO transmission scheme already in advance at a fifth point in time 608. This assumption of the previous rank may for example be done based on a threshold for the length of the gap. This threshold may also e.g. be adapted to speed of the mobile communication device 101, i.e. how fast the channel changes at the mobile communication device 101.

According to the request by the LTE transceiver 401, the base station 105 continues transmission using two streams at a sixth point in time 609.

It should be noted that if LTE is already using rank 1 then the faking of rank 1 in the examples described with reference to FIGS. 5 and 6 is not needed. Furthermore, if the scenario changes in between (e.g. if the LTE connection ends), then only the first or the second part of the schemes as described with respect to FIGS. 5 and 6 may be used.

There may be also scenarios where the shared antenna 405 is used by the second RAT (in this example WiFi) only for a very short time. This could be e.g. short tracking measurements by a GPS/GNSS module after it has an acquisition or short quality measurements by WiFi. The data of the short usage may also be stored to enable offline processing afterwards, without the need of the antenna being active.

For such very short antenna switches the overhead of preparing LTE for the switch (e.g. faking rank 1) may be too large compared to the benefit.

In such a case the controller may simply switch the shared antenna 405 for the short time period without informing the LTE transceiver 401. The LTE transceiver 401 in this case experiences a small & short degradation but typically, no severe and long-term effect will be visible because HARQ (Hybrid Automatic Repeat Request) and higher layer retransmissions conceal the impairment. This approach is illustrated in FIG. 7.

Figure 7:
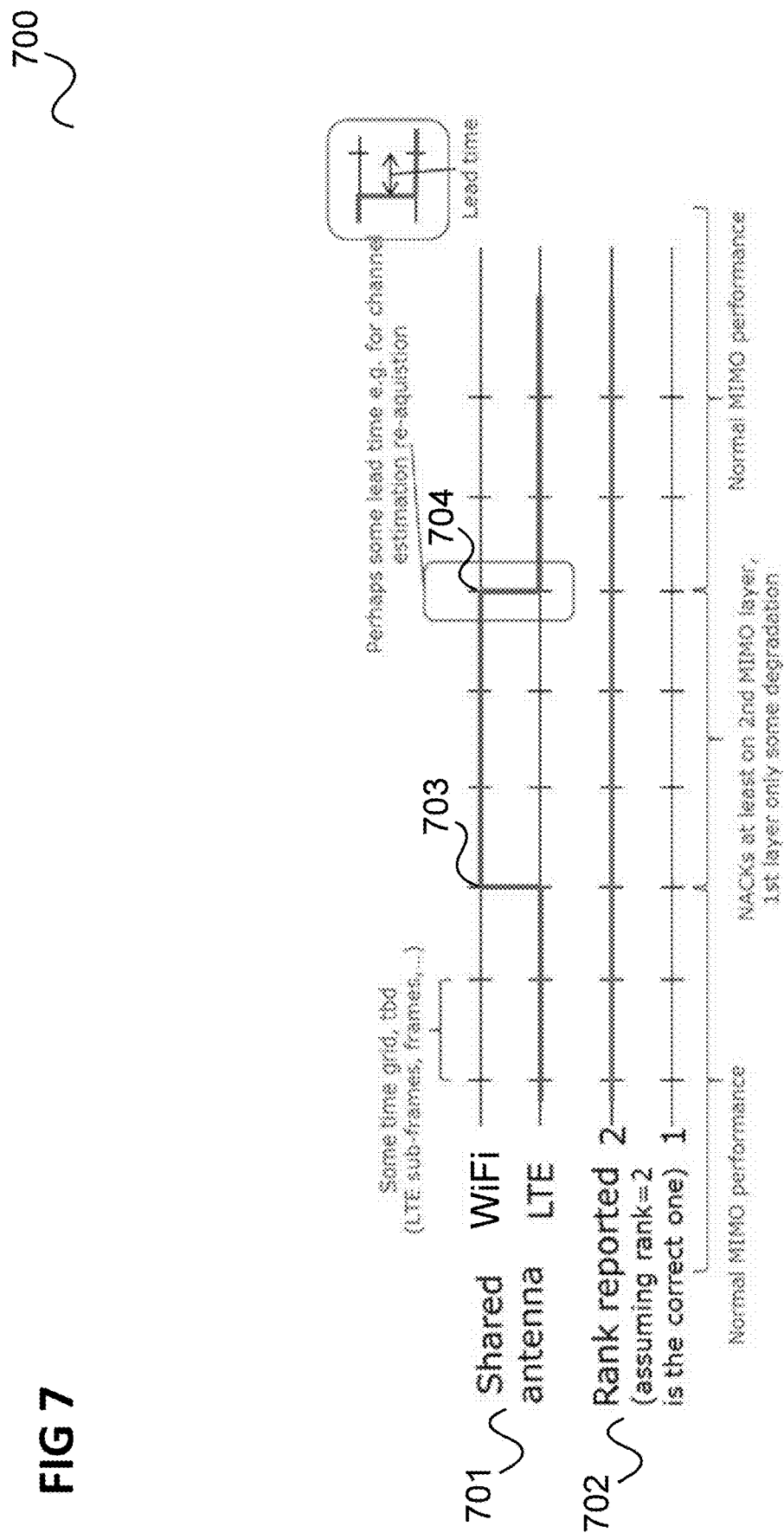
FIG. 7 shows a signal diagram in which a shared antenna is switched from LTE to WLAN for a very short period.

FIG. 7 shows a signal diagram 700.

In the signal diagram 700, time flows from left to right and the assignment of the shared antenna 405 is shown in a first sub-diagram 701 and the MIMO channel matrix rank reported by the LTE transceiver 401 is shown in a second sub-diagram 702.

At first, the shared antenna 405 is assigned to LTE and, due to the good LTE radio conditions, the LTE transceiver 401 reports rank 2 to efficiently use the network capacity.

At a first point in time 703 the controller switches the shared antenna 705 to the WiFi transceiver 402. The controller decides that, due to the short period during which the shared antenna 705 remains switched to the WiFi transceiver 402, the LTE transceiver 401 is not informed about this. Accordingly, the LTE transceiver 401 continues to report rank 2. At a second point in time 704, the shared antenna 705 is switched back to the LTE transceiver 401.

The switch control described above may also be able to control the frequency characterization of the antenna itself. This may be desirable because it may be difficult to create an antenna that covers the full frequency range of both cellular (700 Mhz to 2700 Mhz) and WiFi (2400 Mhz to 5800 Mhz) RATs. The controller may use means to cause an antenna to have an extended frequency range using internal switching of capacitor banks—or any other electrical means which is controlled by the same signal that switches the antenna between the WiFi mode and cellular mode.

In the following, a further example is described. One typical application for a smartphone is tethering. With tethering there exists a cellular connection (e.g. according to 3G or LTE) of the smartphone to the Internet. The smartphone gives access to this Internet connection to another device e.g. via cable, Bluetooth, or WiFi. Thus, this other device (e.g. a tablet, ultrabook, notebook etc.) which may have no own cellular connection can have Internet access, for example even outside of WiFi coverage.

For applications like HDTV/Video streaming very high data rates are required. To achieve a high data rate, a multiple antenna technology such as MIMO (e.g. 2×2), TX diversity and RX Diversity may be used. In the following, an approach for antenna sharing in a tethering scenario where MIMO is used for data transmission. Specifically, in the approach described in the following, a different number of antennas is used for uplink and downlink to reduce the number of antennas in a mobile phone needed for a high-speed tethering scenario.

Figure 8:
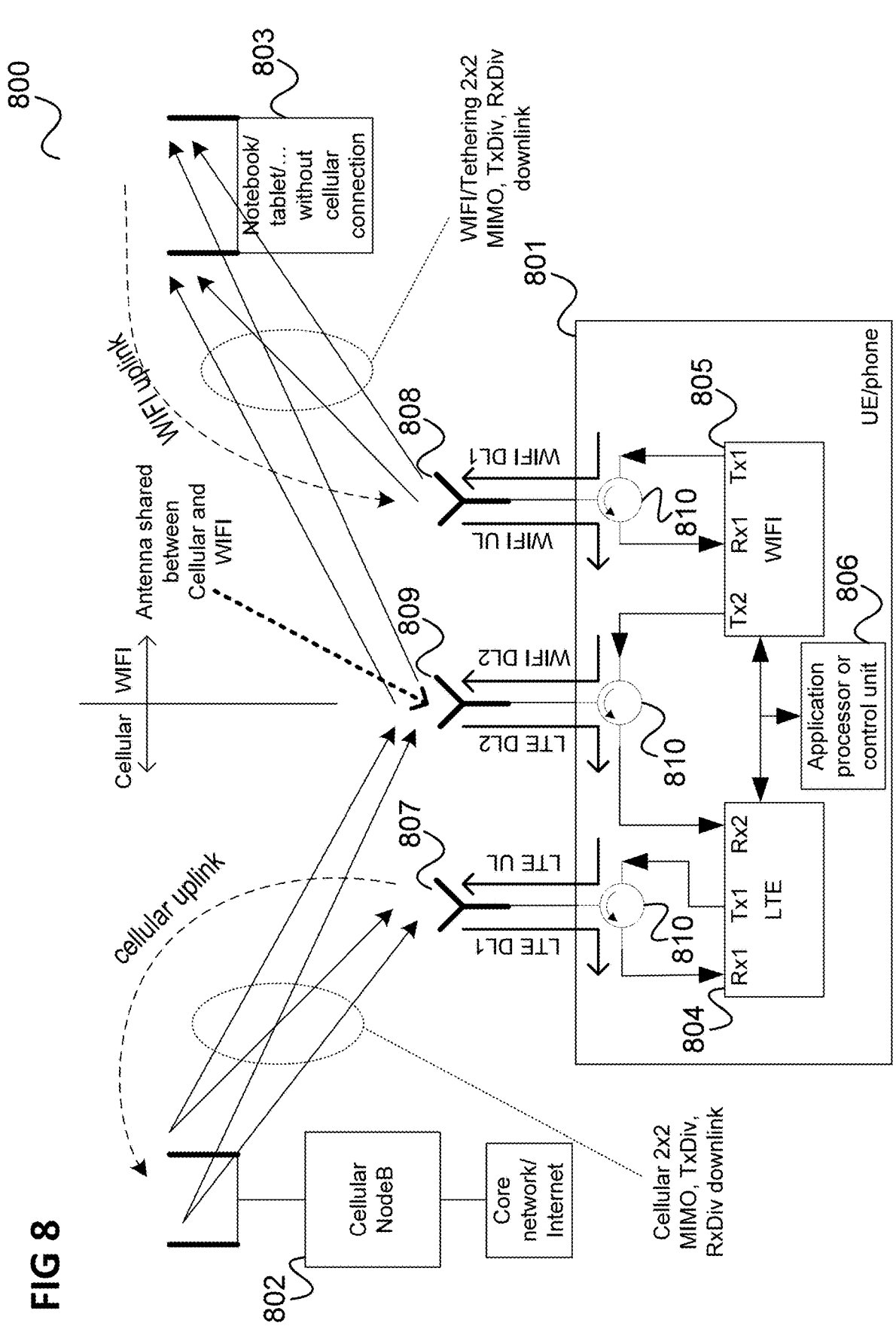
FIG. 8 shows a communication arrangement in a tethering scenario.

FIG. 8 shows a communication arrangement 800.

The communication arrangement 800 includes a mobile phone 801 for example corresponding to the mobile communication device 101, an LTE base station 802 corresponding to the base station 105 and a further communication device 803.

The mobile phone 801 includes an LTE transceiver 804, a WiFi transceiver 805, a controller 806 (e.g. implemented by an application processor or a control circuit) and antennas 807, 808, 809. A first antenna 807 is permanently assigned to LTE, a second antenna 808 is permanently assigned to WiFi and a third antenna 809 is a shared antenna which may be switched by the controller 806 between LTE and WiFi.

In this example, there is a high-speed tethering scenario with the mobile phone 801 (acting as UE (User Equipment) according to LTE) having a LTE 2×2 MIMO (alternatively, this may for example also be 3G/HSDPA MIMO) downlink from the base station 802 for an Internet connection and the mobile phone 801 serving as WiFi access point for tethering to the further device 803, e.g. a Notebook, with 2×2 MIMO WiFi.

In this example, the controller 806 decides to assign the shared antenna 809 to LTE for reception since while the mobile phone 801 only needs to receive a small amount of data from the further device 803, i.e. has little throughput requirements for WiFi reception, the mobile phone 801 has large throughput requirements for LTE reception.

However, for transmission, the shared antenna 809 is assigned to WiFi since it has a high throughput requirement for WiFi transmission while it has a low throughput requirement for LTE transmission.

Thus, there is antenna sharing between the cellular link (i.e. the communication connection between the base station 802 and the mobile phone 801) and the tethering link (i.e. the communication connection between the further communication device 803 and the mobile phone 801). Thus, the number of antennas can be reduced from 4 (2 for 2×2 LTE MIMO and 2 for 2×2 WiFi MIMO) to 3, with still each antenna 807, 808, 809 serving only one radio technology per direction. In other words, uplink and downlink are considered separately per radio technology and reception and transmission per antenna.

Specifically, as the downlink (from the base station 802 to the further device 803) requires a much higher data rate (e.g. for HD Video streaming) than the uplink multiple antenna technologies are only applied in the downlink.

For the scenario of FIG. 8, the downlink includes the downlink connections from the base station 802 to the mobile phone 801 and from the mobile phone 801 to the further device 803. For the cellular downlink connection, i.e. the downlink connection from the base station 105 to the mobile phone 801, the mobile phone 801 is the receiver, while for the tethering downlink connection, i.e. the downlink connections from the mobile phone 801 to the further device 803, it is the transmitter. Accordingly, the mobile phone 801 uses for the cellular downlink connection multiple (here 2) receive antennas, while for the tethering downlink connection the mobile phone 801 uses multiple (here 2) transmit antennas. Considering that for both connections at least one antenna for the reverse (i.e. uplink) direction is needed, the mobile phone 801 may provide the tethering using only 3 antennas instead of 4 with this kind of smart antenna sharing.

The antenna transmission and reception signals may be separated by means of circulators 810. Different frequencies for transmission and reception on one antenna may be used in Frequency Duplex Division (FDD) systems and in Carrier Aggregation scenarios the frequencies may be significantly different. WiFi and e.g. LTE can operate also on similar bandwidth.

The approach described with reference to FIG. 8 may also be applied for more antennas and e.g. higher MIMO schemes (4×2, 4×4 etc.). Further, there may be a matrix connection between the LTE transceiver 804 and the WiFi transceiver 805 and the antennas 807, 808, 809 (i.e. all transceivers can be connected to all antennas, e.g. by a combined digital feed RF chip) and the controller 806 may flexibly optimize which antenna 807, 808, 809 is chosen for which connection. For example, one antenna may be degraded by shadowing for the cellular connection while due to the different angle of reception another antenna may be degraded for the tethering connection. The controller 806 may assign antennas taking such effects into account.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising:
   a first transceiver configured to communicate according to a first radio access technology (RAT) using at least a first antenna;
   a second transceiver configured to communicate according to a second RAT using at least a second antenna;
   a controller configured to:
      receive, from the second transceiver, a request for communication of a streaming type of data;
      in response to receiving said request, transmitting a report to a base station while a rank of a MIMO channel between the first transceiver and the base station is equal to two, wherein the report indicates that the rank of the MIMO channel is one, wherein the report is transmitted via the first transceiver; and
      in response to transmitting the report, controlling the first transceiver to receive a downlink transmission of rank 1 from the base station using the first antenna, and switching a third antenna from the first transceiver to the second transceiver, to enable the second transceiver to perform rank 2 MIMO communication using the second antenna and third antenna.

2. The communication device of claim 1, wherein the first RAT is 3GPP Long Term Evolution, wherein the second RAT is WiFi.

3. The communication device of claim 1, wherein the streaming type of data is streaming video data.

4. The communication device of claim 1, wherein, when the controller receives said request, the first transceiver is engaged in a rank 2 MIMO connection using the first and third antennas.

5. The communication device of claim 4, wherein, when the controller receives said request, the first transceiver is conducting a voice call using the first and third antennas.

6. The communication device of claim 1, wherein the communication device is a wireless user equipment device.

7. The communication device of claim 1, wherein said controlling and said switching support a transfer of the streaming type of data from the base station to a wireless device, via the communication device.

8. The communication device of claim 1, wherein said communication device further comprises the first, second and third antennas.

9. The communication device of claim 8, further comprising circulators, wherein each of the antennas is coupled to a respective one of the circulators.

10. An apparatus comprising processing circuitry, wherein the processing circuitry is configured to cause a user equipment device to:
communicate, via a first transceiver, according to a first radio access technology (RAT) using at least a first antenna;
communicate, via a second transceiver, according to a second RAT using at least a second antenna;
receive, from the second transceiver, a request for communication of a streaming type of data;
in response to receiving said request, transmit a report to a base station while a rank of a MIMO channel between the first transceiver and the base station is equal to two, wherein the report indicates that the rank of the MIMO channel is one, wherein the report is transmitted via the first transceiver; and
in response to transmitting the report, control the first transceiver to receive a downlink transmission of rank 1 from the base station using the first antenna, and switch a third antenna from the first transceiver to the second transceiver, to enable the second transceiver to perform rank 2 MIMO communication using the second antenna and third antenna.

11. The apparatus of claim 10, wherein the first RAT is 3GPP Long Term Evolution, wherein the second RAT is WiFi.

12. The apparatus of claim 10, wherein the streaming type of data is streaming video data.

13. The apparatus of claim 10, wherein, when the request is received, the first transceiver is engaged in a rank 2 MIMO connection using the first and third antennas.

14. The apparatus of claim 13, wherein, when the request is received, the first transceiver is conducting a voice call using the first and third antennas.

15. The apparatus of claim 10, wherein said controlling and said switching support a transfer of the streaming type of data from the base station to a wireless device, via the user equipment device.

16. A non-transitory memory medium storing program instructions, wherein the program instructions, when executed by processing circuitry, cause a user equipment (UE) device to perform operations comprising:
communicating, via a first transceiver, according to a first radio access technology (RAT) using at least a first antenna;
communicating, via a second transceiver, according to a second RAT, using at least a second antenna;
receiving, from the second transceiver, a request for communication of a streaming type of data;
in response to receiving said request, transmitting a report to a base station while a rank of a MIMO channel between the first transceiver and the base station is greater than one, wherein the report indicates that the rank of the MIMO channel is one, wherein the report is transmitted via the first transceiver; and
in response to transmitting the report, controlling the first transceiver to receive a downlink transmission of rank 1 from the base station using the first antenna, and switching a third antenna from the first transceiver to the second transceiver, to enable the second transceiver to perform rank N MIMO communication using at least the second antenna and third antenna, wherein N is greater than one.

17. The non-transitory memory medium of claim 16, wherein, when the request is received, the first transceiver is engaged in a rank 2 MIMO connection using the first and third antennas.

* * * * *